May 4, 1943.                    C. S. ASH                    2,317,972
                            AUTOMOTIVE VEHICLE
                            Filed July 20, 1939
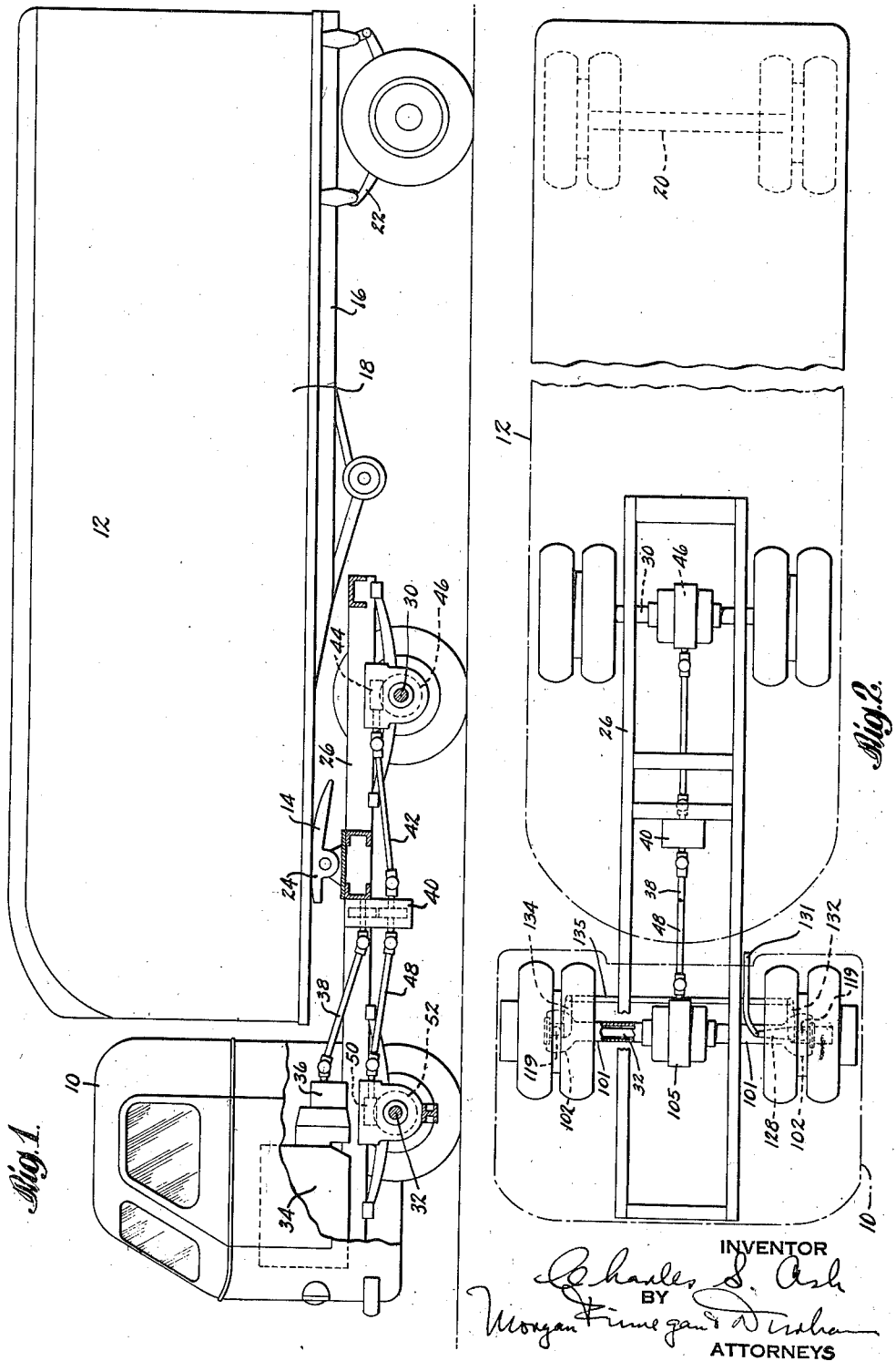

Patented May 4, 1943

2,317,972

UNITED STATES PATENT OFFICE 2,317,972

AUTOMOTIVE VEHICLE

Charles S. Ash, Milford, Mich.

Application July 20, 1939, Serial No. 285,485
In Great Britain November 10, 1938

1 Claim. (Cl. 180—14)

The present invention relates to new and useful improvements in automotive road vehicles and more particularly to a novel and improved tractor-trailer vehicle.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Figure 1 is a partially diagrammatic side elevation, with certain parts broken away of a typical and illustrative embodiment of the present invention; and, Figure 2 is a bottom plan view of the embodiment shown in Figure 1 of the drawing.

The present invention has for its object the provision of a novel and improved automotive vehicle which has unusual grade climbing ability, as well as a high load carrying capacity. A further object of the invention is the provision of a tractor-trailer vehicle in which the high total load carrying capacity of the vehicle is attained without increasing the number of axles and without the increase of the axle loading beyond the commonly prevailing legal limit. The invention also provides a heavy duty tractor unit in which the load carried by the tractor axles while they are pulling and partially supporting a semi-trailer is substantially equally distributed. Still another object of the invention is the provision of an improved automotive tractor-trailer vehicle which is extremely economical in its operation and can be used on many types of terrain where more conventional types of heavy-duty vehicles could not be used.

The present invention provides an automotive tractor-trailer vehicle in which the tractor and trailer axles may be substantially equally loaded with the load substantially uniformly distributed over the several tires of the vehicle, and in which the wheels of the tractor are preferably each independently driven, thereby increasing the useful tractive effort which may be applied, decreasing the individual tire loading, increasing the vehicle capacity, eliminating excessive tire wear and tendency to skidding and at the same time making the operation of the vehicle more economical.

The invention is illustratively embodied as a tractor-trailer automotive vehicle in which the fifth-wheel or other pivotal connection between the tractor and semi-trailer is positioned substantially in advance of the rear driving axle of the tractor, while the motor of the tractor is positioned over or slightly in advance of the front axle, the relative position of these parts being so related to the relative weights of the parts and the load to be carried by the trailer that the axles of the tractor and of the semi-trailer are substantially equally loaded. Preferably, all of the axles of the vehicle are provided with independently rotatable dual wheels, the dual wheels of the tractor unit being independently, or differentially driven so that they are capable of independent rotation, thereby effecting economy in fuel, tires and other wear and tear, and at the same time assisting in reducing the tendency of the vehicle to skid. One of the axles of the tractor is provided with steering means so that its dirigible, dual wheels may be pivotally moved for the steering of the tractor and thereby the vehicle as a whole, and as there are double the conventional number of dirigible wheels, and the load carried by the dirigible dual wheels is thereby greater than usual, the vehicle can be steered more easily and with greater certainty, while the tractive effort which may be usefully applied through the vehicle wheels is one-third greater than is obtainable even with an all-wheel-drive six-wheel tractor.

It will be understood that the foregoing general description and the following detailed description as well, are exemplary and explanatory of the invention but are not restrictive thereof.

Referring now in detail to the embodiment of the invention shown in the accompanying drawing, there is provided a tractor 10 and a semi-trailer 12 interconnected by means of a fifth wheel 14 so that the front end of the semi-trailer is supported by and pivotally connected to the tractor for the pulling, braking and steering of the tractor.

The semi-trailer comprises a chassis 16 on which is mounted the cargo-carrying body 18 and at the rear end of the trailer is provided an axle 20 connected to the chassis by means of springs 22. Near the front end of the trailer but slightly to the rear of the conventional position is mounted a king pin (not shown) which is received and engaged by the fifth wheel member 24 carried on and fastened to the tractor chassis 26.

The tractor is preferably of the type commonly known in the trade as "cab over engine" and comprises the chassis 26 at the rear of which is a driving axle 30 and near the front of which is another driving axle 32. Power is applied to the axles from the rotor 34 through the usual change speed transmission 36, driving shaft 38 and four wheel drive transmission 40, the power being transmitted from the transmission 40 through propeller shaft 42 to worm 44 meshing with differential ring gear 46 which drives the rear axle 30 in a conventional manner. Power is applied to the front axle 32 from the transmission 40 by means of a propeller shaft 48 driving worm 50 which meshes with the worm ring gear of the differential 52 driving the two halves of axle 32 in the usual manner.

As shown, the motor 34 is preferably positioned slightly in advance of the front axle 32, although the exact position of the motor and axles 30 and 32 will be determined by the relative weights of the vehicle parts and by the load carrying capacity of the semi-trailer 12, and these parts and the position of the fifth wheel 14 is preferably so arranged that the axles 20, 30 and 32 carry a substantially equal load when the semi-trailer 12 is loaded to its normal capacity.

In accordance with the preferred embodiment of the invention, the semi-trailer axle 20 is provided at each of its ends with a pair of independently rotatable dual wheels which may be of the general type and construction shown in the patent to Fuhrman, No. 1,975,206, or Higbee Re. 20,744, Kendall No. 2,082,299, or Higbee No. 2,132,029.

The rear axle 30 of the tractor unit is also provided with independently rotatable dual wheels which may be independently or differentially driven and these wheels and axle may be of the general type and construction shown in the patent to Angell No. 1,959,147; Lichty, No. 1,994,719; Higbee, No. 2,126,960; and Higbee, No. 2,142,787.

The independently rotatable driven dirigible dual wheels at the ends of the front axle 32 may be of any desired type but are illustratively shown as being of the type and construction more fully disclosed in my copending application Ser. No. 270,757, filed April 29, 1939, now Patent No. 2,264,785. As described in said application a front axle beam is provided comprising a housing 101 formed to include at its central portion a differential drive 105 and having at each end a hollow, spherical knuckle 102 upon which a set of dual wheels is dirigibly mounted through the medium of a suitable king pin connection indicated by the numeral 119. A spindle arm 128, to which is connected a rod 131, is connected to the steering mechanism in any known and suitable manner and arms 132 and 134, fixed to the spindle knuckles (not shown), are connected together by a rod 135, all in a known manner, to turn the front wheels to effect the steering of the vehicle.

The embodied form of means for driving all four of the front wheels, as here exemplarily embodied comprises at either side a live shaft 32, driven from the differential which is mounted in the axle housing 101, such a shaft extending from the differential to the dual wheels at either end of the axle shaft.

Suitable braking means are provided for all of the wheels and may be of any desired construction such as are shown in the patents referred to above.

Thus, the invention provides a tractor-trailer automotive vehicle particularly adapted for heavy duty service over rough terrain as well as for high speed service on good roads and in which all of the tires and axles are substantially equally loaded, the drive of the vehicle is applied through eight wheels and the braking force may be applied through all twelve of the vehicle wheels.

The invention in its broader aspects is not limited to the specific mechanisms shown and described but departures may be made therefrom within the scope of the accompanying claim without departing from the principles of the invention and without sacrificing its chief advantages.

What I claim is:

An articulated, automotive tractor-semi-trailer road vehicle including a wheeled tractor and a wheeled semi-trailer, the tractor being provided with front and rear dual wheels at each side thereof, some of the wheels being dirigibly mounted, a motor on the tractor carried largely in front of the front wheels and connected to drive the front and rear wheels of the tractor, the semi-trailer having dual wheels near its rear end and a pivotal fifth-wheel connection near its front end between the tractor and semi-trailer for pulling and supporting the front end of the semi-trailer, the semi-trailer having a load receiving portion extending from rear to front, said load receiving portion being of substantially uniform height and cross-section throughout its length and extending at the front well in advance of said fifth-wheel connection and of the rear wheels of said tractor, said fifth-wheel connection being positioned rearwardly of the front end of said semi-trailer a distance greater than the distance the rear wheels of said semi-trailer are disposed forwardly from the rear end of said semi-trailer, said fifth-wheel connection also being disposed between the front and rear wheels of said tractor, but nearer to the rear wheels than to the front wheels thereof, the wheels, motor and pivotal fifth-wheel connection being thereby so positioned and arranged that all of the wheels may be substantially equally loaded when the trailer is carrying its normal load.

CHARLES S. ASH.